United States Patent [19]

Inoue

[11] Patent Number: 5,180,696
[45] Date of Patent: Jan. 19, 1993

[54] HIGH-TOUGHNESS ZRO₂ SINTERED BODY AND METHOD OF PRODUCING SAME

[75] Inventor: Ryoji Inoue, Yasugi, Japan

[73] Assignee: Hitachi Metals, Ltd., Tokyo, Japan

[21] Appl. No.: 202,668

[22] Filed: Jun. 6, 1988

[30] Foreign Application Priority Data

Jun. 11, 1987 [JP] Japan ................. 62-145963
Jun. 11, 1987 [JP] Japan ................. 62-145964

[51] Int. Cl.⁵ ............... C04B 35/56; C04B 35/50; C04B 35/48; C04B 35/10
[52] U.S. Cl. ..................... 501/87; 501/88; 501/95; 501/96; 501/103; 501/105
[58] Field of Search .............. 501/87, 88, 95, 96, 501/103, 105

[56] References Cited

U.S. PATENT DOCUMENTS

| | | | |
|---|---|---|---|
| 3,957,500 | 5/1976 | Pitts | 501/103 |
| 4,221,650 | 9/1980 | Friese et al. | 204/195 S |
| 4,360,598 | 11/1982 | Otagiri et al. | 501/152 |
| 4,370,393 | 1/1983 | Watanabe et al. | 501/103 |
| 4,525,464 | 6/1985 | Claussen et al. | 501/103 |
| 4,585,499 | 4/1986 | Mase et al. | 501/103 |
| 4,753,902 | 6/1988 | Ketchan | 501/103 |

FOREIGN PATENT DOCUMENTS

| | | |
|---|---|---|
| 0131774 | 6/1984 | European Pat. Off. |
| 2231539 | 6/1972 | Fed. Rep. of Germany |
| 2810134 | 3/1978 | Fed. Rep. of Germany |
| 60-145957 | 1/1985 | Japan |
| 60-54972 | 3/1985 | Japan |
| 60-86073 | 5/1985 | Japan |
| 61-21184 | 5/1986 | Japan |
| 61-59265 | 12/1986 | Japan |
| 61-59267 | 12/1986 | Japan |

OTHER PUBLICATIONS

"Zirconia Ceramics I", edited by Shigeyuki Munemiya, 1983, p. 120 (FIG. 3).
Tech. Report No. 3 (1978), F. F. Lange.
Tech. Report No. 7 (1979), F. F. Lange.
Tech. Report of Tohoku University Metal Materials Laboratory, No. 12, pp. 19-21, Mar. 1987.

Primary Examiner—Mark L. Bell
Attorney, Agent, or Firm—Finnegan, Henderson, Farabow, Garrett & Dunner

[57] ABSTRACT

A high-toughness $ZrO_2$ sintered body having a stress-induced transformation ratio of 25% or more, which consists essentially of 40-90 volume % of $ZrO_2$ containing 0.1-3 mol % of $Nd_2O_3$ and 0.5-3.5 mol % of $Y_2O_3$ as stabilizers of the crystal structure of $ZrO_2$, and 10-60 volume % of at least one of $Al_2O_3$, SiC, TiC, $B_4C$ and $TiB_2$.

12 Claims, No Drawings

HIGH-TOUGHNESS ZRO₂ SINTERED BODY AND METHOD OF PRODUCING SAME

BACKGROUND OF THE INVENTION

The present invention relates to a $ZrO_2$ sintered body containing $Y_2O_3$ and $Nd_2O_3$ as stabilizers of the crystal structure of $ZrO_2$ (hereinafter referred to simply as "stabilizers"), and more particularly to a $ZrO_2$ sintered body having high toughness for use in tools such as dies and cutters, structural parts, decorating parts, etc.

Recently, partially stabilized zirconia (simply "PSZ") has been getting much attention as a high-strength, high-toughness ceramic. This PSZ undergoes stress-induced transformation, that is a phenomenon in which tetragonal $ZrO_2$ metastable at room temperature is transformed into stable monoclinic $ZrO_2$ under the influence of an outside force. Specifically, an outside force is absorbed as energy for the transformation, and $ZrO_2$ undergoes a volume increase, preventing the generation of cracks which cause fracture. This provides $ZrO_2$ with high strength and toughness.

The PSZ which is presently being used presently is $Y_2O_3$-PSZ, which contains a small amount of $Y_2O_3$ as a stabilizer. This $Y_2O_3$-PSZ is fully described in "Microstructurally Developed Toughening Mechanisms in Ceramics," Technical Report No. 3, F. F. Lange, Rockwell International, July 1978. In addition, Japanese Patent Publication No. 61-21184 (Japanese Patent Laid-Open No. 56-134564) discloses that $Y_2O_3$-PSZ has high strength and high durability at 200°-300° C. when satisfying the conditions that the $Y_2O_3$ content is 2-7 mol %, that its crystal structure is mainly composed of a tetragonal phase, and that its average crystal grain size is 2 μm or less.

Further, "Microstructurally Developed Toughening Mechanisms in Ceramics, Technical Report No. 7, F. F. Lange, Rockwell International, October 1979 discloses a $ZrO_2$—$Y_2O_3$—$Al_2O_3$ sintered body, and Japanese Patent Publication No. 61-59265 (Japanese Patent Laid-Open No. 58-32066) discloses a zirconia sintered body containing $Y_2O_3$, etc. as stabilizers and consisting essentially of 40-99.5 wt % of tetragonal $ZrO_2$ and 0.5-60 wt % of $Al_2O_3$.

These zirconia sintered bodies have improved hardness and strength because the solution and dispersion of $Al_2O_3$ in $ZrO_2$ lowers the temperature at which tetragonal $ZrO_2$ is transformed into the monoclinic phase, preventing the grain growth of $ZrO_2$, thereby increasing the content of tetragonal $ZrO_2$ and also enhancing the sliding resistance of $ZrO_2$ grains along the grain boundaries.

On the other hand, various attempts have been made to provide methods of producing such zirconia sintered bodies. For instance, Japanese Laid-Open No. 60-54972 discloses a method of producing $ZrO_2$ ceramics having improved strength by pressing $ZrO_2$ powder containing a certain amount of stabilizers such as $Y_2O_3$, etc. and sintering it to a relative density of 93% or more, and then subjecting the sintered body to hot isostatic pressing (simply HIP).

Japanese Patent Publication No. 61-59267 (Japanese Patent Laid-Open No. 58-36976) gives consideration the starting material powder, proposing the use of starting material powder produced by a coprecipitation method in which each component of $ZrO_2$, stabilizers and $Al_2O_3$ can ideally be dispersed, and sintering it to provide a sintered body having a uniform structure with substantially no micropores.

Further, Japanese Patent Laid-Open No. 60-86073 discloses the use of the above HIP method using starting material powder produced by a coprecipitation method.

Various attempts have been made to use stabilizers other than $Y_2O_3$. For instance, Technical Report of Tohoku University Metal Materials Laboratory, No. 12, pp. 19-21 (March, 1987) shows the effects of stabilizing tetragonal $ZrO_2$ by a system (3.5 mol %, $Ln_2O_3$Sc$_2O_3$, $Y_2O_3$, $La_2O_3$, $Ce_2O_3$, $Pr_2O_3$, $Nd_2O_3$.) It is indicated that among the above oxides, $Nd_2O_3$ shows the largest next to $Y_2O_3$.

However, with respect to the use of the conventional PSZ in tools such as dies and cutters, it is inferior to competing cemented carbide in toughness and hardness. Accordingly, PSZ has been used in extremely limited applications, and it has been considered difficult to find sufficient applications.

Particularly, when $Al_2O_3$ is added, the toughness of $ZrO_2$ ceramics markedly decreases, although its strength and hardness increase. Accordingly, there is a need for the development of $ZrO_2$ ceramics having excellent strength, toughness and hardness.

OBJECT AND SUMMARY OF THE INVENTION

In view of the above circumstances, the present invention is aimed at increasing the toughness of $Y_2O_3$-PSZ ceramics.

As a result of intense research, the inventor has found the conventional $Y_2O_3$-PSZ can be improved to have better toughness by adding both $Y_2O_3$ and $Nd_2O_3$ in certain amounts as stabilizers, thereby providing a $ZrO_2$ sintered body with a crystal structure mainly composed of a tetragonal phase or a mixture of a tetragonal phase and a cubic phase, and having an average crystal grain size of 2 μm or less, particularly 1 μm or less.

Thus, the high-toughness $ZrO_2$ sintered body according to one embodiment of the present invention contains 0.1-3 mol of $Nd_2O_3$ and 0.5-3.5 mol % of $Y_2O_3$ as stabilizers.

The high-toughness $ZrO_2$ sintered body according to another embodiment of the present invention contains $Nd_2O_3$ and $Y_2O_3$ as stabilizers, and has a crystal structure mainly composed of a tetragonal phase or a mixture of a tetragonal one and a cubic phase and further an average crystal grain size of 1 μm or less.

The method of producing a high-toughness $ZrO_2$ sintered body containing 0.1-3 mol % of $Nd_2O_3$ and 0.5-3.5 mol % of $Y_2O_3$ as stabilizers according to the present invention comprises the steps of pressing starting material powder having the above composition to provide a green body, and after sintering, subjecting it to hot isostatic pressing at a temperature of 1300°-1600° C. and a pressure of 100 kg/cm² or more.

The high-toughness $ZrO_2$ sintered body according to a further embodiment of the present invention consists essentially of 40-90 volume % of $ZrO_2$ containing 0.1-3 mol % of $Nd_2O_3$ and 0.5-3.5 mol % of $Y_2O_3$ as stabilizers and 10-60 volume % of at least one of $Al_2O_3$, SiC, TiC, $B_4C$ and $TiB_2$.

The high-toughness $ZrO_2$ sintered body according to a still further embodiment of the present invention contains $Nd_2O_3$ and $Y_2O_3$ as stabilizers and has a crystal structure substantially composed of a tetragonal phase or a mixture of a tetragonal phase and cubic phase, with an average crystal grain size of 2 μm or less, the sintered body consisting essentially of 40-90 volume % of $ZrO_2$ and 10-60 volume % of at least one of Al SiC, TiC, $B_4C$ and $TiB_2$.

Further, the method of producing a high-toughness $ZrO_2$ sintered body consisting essentially of 40-90 volume % of $ZrO_2$ containing 0.1-3 mol % of $Nd_2O_3$ and 0.5-3.5 mol % of $Y_2O_3$ as stabilizers and 10-60 volume % of at least one of $Al_2O_3$, SiC, TiC, $B_4C$ and $TiB_2$ according to a still further embodiment of the present invention, comprises the steps of pressing starting material powder having the above composition to provide a green body, and after sintering, subjecting it to hot isostatic pressing at a temperature of 1300°-1600° C. and a pressure of 100 kg/cm² or more.

DETAILED DESCRIPTION OF THE INVENTION

The improvement of toughness of a $ZrO_2$ sintered body can be achieved by stress-induced transformation from tetragonal structure to monoclinic structure as mentioned above, but detailed investigation of various stabilizers has led to the discovery that the addition of both $Nd_2O_3$ and $Y_2O_3$ to $ZrO_2$ gives a maximum stress-induced transformation ratio from tetragonal $ZrO_2$ to monoclinic $ZrO_2$. Thus, the inventor has found that the addition of both $Nd_2O_3$ and $Y_2O_3$ gives substantially higher toughness to a $ZrO_2$ sintered body than the conventional stabilizers do.

The term "substantially high toughness" used herein has the following meaning: A $ZrO_2$ sintered body containing a monoclinic phase, for instance, a $ZrO_2$ sintered body containing about 2 mol % of $Y_2O_3$ has high apparent toughness because of microcracks due to the existence of a monoclinic phase, but when it is used for tools such as dies and cutters it does not exhibits the wear resistance and chipping resistance that would be expected from the measured toughness. From this aspect, a $ZrO_2$ sintered body containing no monoclinic phase, which contains about 2.5-3 mol % of $Y_2O_3$ is conventionally used as a high-toughness material practically.

With respect to toughness required for tools, it is important that $ZrO_2$ ceramics have microcracks; in other words, they have a mechanism of exhibiting high toughness without containing a monoclinic phase.

Why a conventional $ZrO_2$ sintered body having microcracks, in other words, conventional $ZrO_2$ with a monoclinic phase, shows high toughness is not by its material but by its structure, contributing to the toughness. On the other hand, the sintered body according to the present invention is characterized by containing no monoclinic phase other than that existing on the surface of the sintered body which may be formed by stress-induced transformation while working, such as grinding, and by having a crystal structure substantially composed of a tetragonal phase or a mixture of tetragonal one and cubic one with a high stress-induced transformation ratio of the tetragonal phase which leads to high toughness.

Incidentally, as mentioned above, the addition of $Y_2O_3$ or $Nd_2O_3$ individually to $ZrO_2$ as a stabilizer is already known. However, as described in Technical Report of Tohoku University Metal Materials Laboratory, the effects of stabilizing tetragonal $ZrO_2$ by $Nd_2O_3$ do not exceed those by $Y_2O_3$, and there has been no disclosure about stress-induced transformation ratio of a tetragonal phase. Accordingly, the addition of both $Nd_2O_3$ and $Y_2O_3$ has never been taught.

In the present invention, $Nd_2O_3$ is limited to 0.1-3 mol % and $Y_2O_3$ is to 0.5-3.5 mol %, both based on the amount of sintered body, because when they are less than the lower limit, a monoclinic phase appears, and when they exceed the upper limits the percentage of a cubic phase increases, while decreasing the content of a tetragonal phase. The preferred amount of $Nd_2O_3$ is 0.5-1.5 mol % and the preferred amount of $Y_2O_3$ is 1-2 mol %.

To achieve high toughness, the crystal structure of a $ZrO_2$ sintered body is substantially composed of a tetragonal phase, or a tetragonal phase and a cubic phase in combination.

As defined herein, the term "substantially tetragonal phase or a mixture of a tetragonal phase and a cubic phase" means that the sintered body does not contain the monoclinic phase other than that existing in the surface of the sintered body generated by a stress-induced transformation caused by working, etc., and that it has a crystal structure substantially composed of a tetragonal phase, or if a cubic phase exists, the percentage of the cubic phase to the all crystal structure is 30 mol % or less.

To achieve the crystal structure of a sintered body which is substantially composed of a tetragonal phase or a mixture of a tetragonal phase and a cubic phase, it is important that an average crystal grain size of the sintered body is 1 μm or less.

According to the present invention, the stress-induced transformation ratio can be increased to as high as 25% or more, or preferably as high as 30% or more, while it is 20% or so for the conventional $Y_2O_3$-PSZ.

Incidentally, the stress-induced transformation ratio in the present invention is defined by a method shown in Examples later.

Next, to provide the $ZrO_2$ sintered body with high hardness, it is necessary that the $ZrO_2$ sintered body has a second phase by adding 10-60 volume % of $Al_2O_3$, SiC, TiC, $B_4C$ and $TiB_2$ alone or in combination. When the amount of these compounds is less than 10 volume %, sufficient improvement in hardness cannot be achieved. On the other hand, when it exceeds 60 volume %, the toughness decreases remarkably.

$Al_2O_3$, SiC, TiC, $B_4C$ and $TiB_2$ are selected because they have high hardness and their fine powder is easily available. When $Al_2O_3$ is added, sintering in the air is possible. However, when SiC, TiC, $B_4C$ or $TiB_2$ is added, hot pressing in vacuum or in the non-oxidizing atmosphere should be conducted to achieve high density. Incidentally, any of $Al_2O_3$, SiC, TiC, $B_4C$ and $TiB_2$ may be in the form of fiber or whisker.

The resulting sintered body should be subjected to hot isostatic pressing at a temperature of 1300°-1600° C. and the pressure of 100 kg/cm² or more to achieve further higher density and strength.

To disperse whiskers in $ZrO_2$ to provide it with higher toughness, it is necessary to use whiskers having higher elasticity and smaller thermal expansion coefficient than $ZrO_2$.

Any of $Al_2O_3$, SiC, TiC, $B_4C$ and $TiB_2$ satisfy these requirements, and property sized whiskers can be dispersed in a $ZrO_2$ matrix uniformly to prevent cracks from propagating by changing and dividing their directions to absorb internal energy, thereby achieving high toughness. The size of the whisker is suitably 0.5-3 μm in diameter and 5-100 μm in length.

As starting material powder, salts which can form $ZrO_2$, $Y_2O_3$, $Nd_2O_3$, or if necessary $Al_2O_3$ after burning may be used, and preferably powder produced by a wet method such as a coprecipitation method can be used to provide a ZrO2 sintered body with more uniform composition.

The present invention will be explained in further detail by means of the following Examples.

EXAMPLE 1

Commercially available ZrO2 - 1.5-2.5 mol % Y2O3 powder prepared by a coprecipitation method and neodymium nitrate [Nd(NO3)3.6H2O] were mixed in various after-sintering compositions shown in Table 1 and ball-milled in a wet state. A binder was added to each mixture to prepare a slurry which was then formed into granules by a spray drier, and the granules were rubber-pressed at a pressure of 3 ton/cm². The resulting green body was sintered at a temperature of 1500° C. in the atmosphere and then subjected to a HIP treatment in an AR gas at 1450° C. and 1500 atm. Each piece thus prepared (simply "TP") was evaluated with respect to various properties by the following methods.

Bending strength was measured according to JIS R1601.

Fracture toughness was calculated by the following Niihara's Equation from data obtained by a Bickers hardness test (load 20 kg).

$$(K_{IC}/Ha^{\frac{1}{2}})(H/E)^{2/5} = 0.018(l/a)^{-\frac{1}{2}}$$

$K_{IC}$: Fracture toughness, H: Vickers hardness
E: Young's modulus, a: Half of dent
l: Half of (Crack length - Indentation diameter)

A stress-induced transformation ratio is expressed by a ratio of the proportion of amonochlinc phase generated after a surface of TP is ground by a diamond grinder of #100 at a pressure of about 0.5 kg/cm² for 10 minutes, to the proportion of a tetragonal phase before grinding:

$$\text{Stress-Induced Transformation Ratio} = \frac{Mb - Ma}{Ta} \times 100$$

Ta: Proportion of tetragonal phase before grinding (as annealed at 1200° C. after near finishing) (mol %)
Ma: Proportion of monoclinic phase before grinding (mol %)
Mb: Proportion of monoclinic phase after grinding (mol %)

Hardness was measured by Vickers method under a load of 500 g.

The crystal structure was determined by calculating the proportion (mol %) of a monoclinic phase, a tetragonal phase and a cubic phase by the following equations using peak values of X-ray diffraction (It, Im, Ic). TP was annealed in the air at 1200° C. after mirror finishing.

$$M = \frac{0.82[Im(11\bar{1}) + Im(011)]}{0.82[Im(11\bar{1}) + Im(111)] + It(111) + Ic(111)} \times 100$$

$$T = (1 - M)\frac{It(400) + Ic(004)}{It(400) + It(004) + 0.88Ic(400)} \times 100$$

$$C = 1 - (M + T)$$

The results are shown in Table 1.

TABLE 1

| Test No.[1] | Y2O3[2] (mol %) | Nd2O3[2] (mol %) | Bending Strength (kg/mm²) | Fracture Toughness (MN/m^1.5) | Hardness (Hv) | Crystal[3] Structure (mol %) | Stress-Induced Transformation Ratio (%) | Crystal Grain Size (μm) |
|---|---|---|---|---|---|---|---|---|
| 1 | 1.5 | 0.5 | 97 | 13.6 | 1220 | T | 27 | 0.43 |
| 2 | 1.5 | 1 | 94 | 15.1 | 1190 | T + 7C | 33 | 0.45 |
| 3 | 2 | 0 | 119 | 10.5 | 1290 | T + 6M | 21 | 0.52 |
| 4 | 2 | 0.5 | 128 | 12.2 | 1260 | T | 26 | 0.41 |
| 5 | 2 | 1 | 131 | 14.0 | 1240 | T + 13C | 34 | 0.44 |
| 6 | 2 | 1.5 | 119 | 13.1 | 1220 | T + 18C | 35 | 0.58 |
| 7 | 2.5 | 0 | 154 | 7.1 | 1340 | T | 10 | 0.40 |
| 8 | 2.5 | 0.5 | 142 | 9.2 | 1290 | T + 6C | 22 | 0.38 |
| 9 | 2.5 | 1.0 | 133 | 8.6 | 1250 | T + 13C | 28 | 0.45 |

Note:
[1] Test Nos. 1, 2, 4, 5, 6, 8 and 9: Present invention Test Nos. 3 and 7: Comparative Example
[2] Content in ZrO2
[3] Crystal structure of ZrO2
T: Tetragonal
M: Monoclinic (mol %)
C: Cubic (mol %)

Test No. 3 shows a test piece containing 2 mol % of Y2O3 alone and having a fracture toughness of 10.5 (MN/m^1.5), but it contains a monoclinic phase. Thus, it cannot be said that it has practically high toughness. Test No. 7 shows a test piece of a conventional composition having 2.5 mol % Y2O3, which shows a fracture toughness of 7.1 (MN/m^1.5).

On the other hand, Test Nos. 1, 2, 4, 5, 6, 8 and 9 show test pieces containing no monoclinic phase and having fracture toughness greater than 8.5 (MN/m^1.5).

It is concluded that when the crystal grain size is small the tetragonal phase is stabilized, making the stress-induced transformation less likely, but the addition of both Nd2O3 and Y2O3 evidently increases the stress-induced transformation ratio even when the crystal grain size is small compared to a ZrO2 sintered body containing only Y2O3, thereby contributing to an increase of toughness.

EXAMPLE 2

Commercially available ZrO2(2 mol % Y2O3)-30 vol % Al2O3 powder prepared by a coprecipitation method and neodymium nitrate [Nd(NO3)3.6H2O] were mixed in various after-sintering compositions shown in Table 2, and ball-milled in a wet state. A binder was added to each mixture to prepare a slurry which was then formed into granules by a spray drier, and the granules were rubber-pressed at a pressure of 3 ton/cm². The resulting green body was sintered at a temperature of 1500° C. in the atmosphere and then subjected to a HIP treatment in an Ar gas at 1450° C. and 1500 atm. Each test piece thus prepared (simply "TP") was evaluated with respect to various properties by the same methods as in Example 1.

The results are shown in Table 2.

Test No. 10 shows a test piece containing 2 mol % of $Y_2O_3$ alone and having a fracture toughness of 9.1 ($MN/m^{1.5}$), but it contains a monoclinic phase: Thus, it cannot be said that it has practically high toughness. Test No. 11 shows a test piece of a conventional composition having 3 mol % $Y_2O_3$ alone, which shows a fracture toughness less than 6.0 ($MN/m^{1.5}$).

On the other hand, Test Nos. 12–16 show test pieces containing no monoclinic phase and having fracture toughness higher than 8.5 ($MN/m^{1.5}$).

It is concluded that when the crystal grain size is small the tetragonal phase is stabilized, making the stress-induced transformation less likely, but the addition of both $Nd_2O_3$ and $Y_2O_3$ evidently increases the stress-induced transformation ratio even when the crystal grain size is small compared to a $ZrO_2$ sintered body containing only $Y_2O_3$, thereby contributing to an increase of toughness.

EXAMPLE 3

Commercially available $ZrO_2$-2 mol % $Y_2O_3$ powder prepared by a coprecipitation method, neodymium nitrate and one of SiC (average particle size: 0.5 μm), TiC (average particle size: 0.7 μm), $B_3C$ (average particle size: 2 μm) and $TiB_2$ (average particle size: 0.9 μm) were mixed in various after-sintering compositions shown in Table 2. In each mixture, each of SiC, TiC, $B_4C$ and $TiB_2$ was 30 vol % (Nos. 17–20 in Table 2) based on the total amount. Each mixture was formed resulting green body was placed in a graphite mold and sintered by hot pressing at a temperature of 1500° C. and a pressure of 250 kg/cm² in vacuum for 1 hour, and then subjected to a HIP treatment in an Ar gas at 1500° C. and 1500 atm for 1 hour. Each test piece thus prepared (simply "TP") was evaluated with respect to various properties as in Example 1.

The results are shown in Table 2 (Nos. 17–20). It is verified that the present invention can provide $ZrO_2$ ceramics with excellent toughness and hardness.

EXAMPLE 4

Commercially available $ZrO_2$(2 mol % $Y_2O_3$)-38 vol % $Al_2O_3$ powder prepared by a coprecipitation method, neodymium nitrate and SiC whiskers (average size: 0.8 μm in diameter × 20 μm in length) were mixed in various after-sintering compositions (SiC whisker: 20 vol %) shown in Table 2 (Nos. 21 and 22). Each mixture was sintered in the same manner as in Example 3. The properties of the resulting sintered bodies are shown in Table 2. The data show that the addition of SiC whiskers contributes to improving the stress-induced transformation ratio, and that the addition of both $Y_2O_3$ and $Nd_2O_3$ (No. 22) remarkably increases the stress-induced transformation ratio as compared with a case where only $Y_2O_3$ is added as a stabilizer (No. 21). Therefore, the $ZrO_2$ sintered body of the present invention (No. 22) has excellent fracture toughness.

TABLE 2

| Test[1] No. | $Y_2O_3$[2] (mol %) | $Nd_2O_3$[2] (mol %) | $Al_2O_3$ (vol %) | SiC (vol %) | TiC (vol %) | $B_4C$ (vol %) | $TiB_2$ (vol %) | Bending Strength (kg/mm²) | Fracture Toughness ($MN/m^{1.5}$) | Hardness (Hv) | Crystal[3] Structure (mol %) | S.I.T.R.[4] (%) | Crystal Grain Size (μm) |
|---|---|---|---|---|---|---|---|---|---|---|---|---|---|
| 10 | 2 | 0 | 30 | — | — | — | — | 141 | 9.1 | 1410 | T + 7M | 20 | 0.51 |
| 11 | 3 | 0 | 30 | — | — | — | — | 183 | 5.7 | 1490 | T + 9C | 9 | 0.42 |
| 12 | 2 | 0.5 | 30 | — | — | — | — | 145 | 10.0 | 1400 | T | 27 | 0.46 |
| 13 | 2 | 1 | 30 | — | — | — | — | 139 | 10.3 | 1370 | T + 12C | 33 | 0.43 |
| 14 | 2 | 1.5 | 30 | — | — | — | — | 130 | 9.6 | 1350 | T + 18C | 35 | 0.52 |
| 15 | 1.5 | 0.5 | 30 | — | — | — | — | 138 | 10.9 | 1390 | T | 29 | 0.42 |
| 16 | 1.5 | 1.0 | 30 | — | — | — | — | 131 | 11.6 | 1370 | T + 6C | 34 | 0.43 |
| 17 | 2 | 1 | — | 30 | — | — | — | 148 | 8.6 | 1590 | T + 13C | 31 | 0.54 |
| 18 | 2 | 1 | — | — | 30 | — | — | 142 | 9.3 | 1570 | T + 12C | 32 | 0.59 |
| 19 | 2 | 1 | — | — | — | 30 | — | 90 | 8.1 | 1860 | T + 12C | 30 | 0.81 |
| 20 | 2 | 1 | — | — | — | — | 30 | 153 | 9.2 | 1640 | T + 13C | 30 | 0.65 |
| 21 | 2 | 0 | 30 | 20[5] | — | — | — | 123 | 10.9 | 1750 | T | 29 | 1.48 |
| 22 | 2 | 1 | 30 | 20[5] | — | — | — | 130 | 12.7 | 1740 | T + 12C | 40 | 1.51 |

Note:
[1]Test Nos. 12–20 and 22: Present invention Test Nos. 10, 11 and 21: Comparative Example
[2]Content in $ZrO_2$
[3]Crystal structure of $ZrO_2$
T: Tetragonal
M: Monoclinic (mol %)
C: Cubic (mol %)
[4]Stress-Induced Transformation Ratio
[5]SiC whisker As mentioned above, the addition of both $Y_2O_3$ and $Nd_2O_3$ increases the toughness of a $ZrO_2$ sintered body which is conventionally insufficient. Therefore, the $ZrO_2$ sintered body of the present invention may be used in wide varieties of applications including tools such as dies and cutters.

The present invention has been explained referring to the Examples, but it should be noted that any modifications may be made unless they deviate from the scope of the present invention defined by the claims attached hereto.

What is claimed is:

1. A high-toughness zirconia-based sintered body consisting essentially of $ZrO_2$, and 0.1–3 mol % of $Nd_2O_3$ and 0.5–3.5 mol % of $Y_2O_3$ as stabilizers of the crystal structure of $ZrO_2$, said sintered body having a crystal structure comprised of a substantially tetragonal phase or a mixture of a tetragonal phase and a cubic phase with an average crystal grain size of 1 μm or less.

2. The high-toughness zirconia-based sintered body according to claim 1, wherein said sintered body has a stress-induced transformation ratio of 25% or more.

3. The high-toughness zirconia-based sintered body according to claim 1, wherein the amount of $Nd_2O_3$ is 0.5–1.5 mol % and the amount of $Y_2O_3$ is 1–2 mol %.

4. The high-toughness zirconia-based sintered body according to claim 1, wherein said sintered body has a tetragonal crystal structure.

5. The high-toughness zirconia-based sintered body according to claim 1, wherein said sintered body has a crystal structure comprised of a mixture of a tetragonal phase and up to 30 mol % based on the entire crystal structure, of a cubic phase.

6. A high-toughness zirconia-based sintered body consisting essentially of 40-90 volume % of a first phase consisting essentially of $ZrO_2$, and 0.1-3 % mol % of $Nd_2O_3$ and 0.5-3.5 mol % of $Y_2O_3$ as stabilizers of the crystal structure of $ZrO_2$, and 10-60 volume % of a second phase consisting essentially of at least one of $Al_2O_2$, SiC, TiC, $B_2C$ and $TiB_2$, said sintered body having a crystal structure comprised of a substantially tetragonal phase or a mixture of a tetragonal phase and a cubic phase, and having an average crystal grain size of 2 μm or less.

7. The high-toughness zirconia-based sintered body according to claim 6, wherein said at least one of $Al_2O_3$, SiC, TiC, $B_4C$ and $TiB_2$ is in the form of fibers or whiskers.

8. The high-toughness zirconia-based sintered body according to claim 6, wherein said body has a stress-induced transformation ratio of 25% or more.

9. The high-toughness zirconia-based sintered body according to claim 6, wherein the amount of $Nd_2O_3$ is 0.5-1.5 mol % and the amount of $Y_2O_3$ is 1-2 mol %.

10. The high-toughness zirconia-based sintered body according to claim 7, wherein said body has a stress-induced transformation ratio of 25% or more.

11. The high-toughness zirconia-based sintered body according to claim 6, wherein said sintered body has a crystal structure crystal structure.

12. The high-toughness zirconia-based sintered body according to claim 6, wherein said sintered body has a crystal structure comprised of a mixture of a tetragonal phase and up to 30 mol %, based on the entire crystal structure, of a cubic phase.

* * * * *

UNITED STATES PATENT AND TRADEMARK OFFICE
CERTIFICATE OF CORRECTION

PATENT NO. : 5,180,696
DATED : January 19, 1993
INVENTOR(S) : ROYJI INOUE

It is certified that error appears in the above-identified patent and that said Letters Patent is hereby corrected as shown below:

Claim 6, column 9, line 10, "$Al_2O_2$" should be --$Al_2O_3$--, and "$B_2C$" should be --$B_4C$--.

Claim 11, column 10, line 12, "crystal structure crystal structure" should be --tetragonal crystal structure--.

Signed and Sealed this

Seventh Day of December, 1993

Attest:

BRUCE LEHMAN

Attesting Officer        Commissioner of Patents and Trademarks